United States Patent Office 3,306,929
Patented Feb. 28, 1967

3,306,929
DIESTERS OF 5,5,5-TRINITRO-1,2-PENTANEDIOL
Gustave B. Linden, Short Hills, N.J., assignor to Aerojet-General Corporation, Azusa, Calif., a corporation of Ohio.
No Drawing. Filed Nov. 26, 1963, Ser. No. 326,288
4 Claims. (Cl. 260—488)

This invention relates to certain novel polynitro compounds and their method of preparation.

It is an object of this invention to prepare certain novel organic nitro compounds. It is still another object of this invention to prepare new nitro compounds in a novel manner. These and other objects of this invention will be apparent from the detailed description which follows.

One class of novel compounds of this invention have the following general formula:

(I)
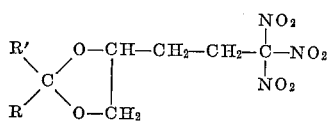

wherein R is hydrocarbyl, preferably lower alkyl having from 1 to about 10 carbon atoms such as methyl, ethyl, butyl and hexyl, and R' is selected from the group consisting of hydrocarbyl and hydrogen. The hydrocarbyl groups in Formula I may be in addition to alkyl, aryl, preferably lower aryl containing 6 to 12 carbons, i.e., phenyl and naphthyl; alkaryl, preferably lower alkaryl containing from 7 to 20 carbons; and aralkyl, preferably lower aralkyl containing 7 to 20 carbons.

The compounds of Formula I are prepared in accordance with the following general reaction equation:

(II)
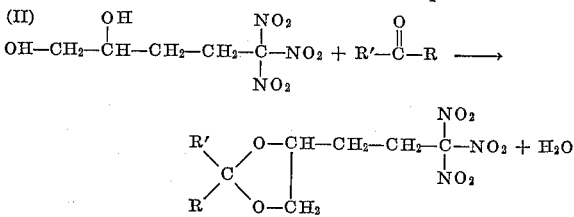

wherein R and R' are as defined above.

According to Reaction II, it can be seen that the 5,5,5-trinitro-1,2-pentanediol is reacted with an aldehyde or ketone to form a substituted -4(3',3',3'-trinitropropyl-1,3 dioxolane.

Illustrative compounds which are obtained by the practice of Reaction II together with the corresponding reactant materials are set forth in Table I below.

The above reaction may optionally be carried out in any inert solvent, i.e., polar solvents such as water, methanol, ethanol, etc.; and non-polar solvents, i.e., benzene, hexane, toluene, etc. The proportions of the reactants employed in the reaction are not critical. Normally, stoichiometrically equivalent amounts are used since this results in the most economical utilization of the reactants. Thus, usually one mole of alcohol is used per mole of ketone or aldehyde. The reaction temperature should normally be sufficiently high so that the reactants will dissolve to a substantial degree in the reaction medium, but in any event, the reaction temperature should be below the composition temperature of the reactant. Normally, the reaction is conducted at a temperature between about 0° C. and about 100° C. The most preferred temperature is from about +20° C. to about 90° C. Pressure is not critical in this reaction. Therefore, while any pressure can be used, the reaction is normally run under atmospheric pressure.

The above reaction is preferably conducted in the presence of an effective catalytic amount of an acid esterification catalyst such as cupric sulfate or boron trifluoride etherate.

EXAMPLE I

*Preparation of the 2,2-dimethyl-4(3',3',3'-trinitropropyl)-1,3-dioxolane*

The 5,5,5-trinitro-1,2-pentanediol (427 grams) was dissolved in 1500 ml. acetone. This solution was stirred with 600 g. anhydrous powdered cupric sulfate and 3 ml. boron trifluoride etherate for 20 hours. The copper sulfate was removed by filtration and the acetone was removed under reduced pressure. The residual oil was transferred to a beaker and 600 ml. ice water was added with stirring. The oil crystallized instantly. The product was filtered, washed thoroughly with ice water, and dried in vacuo. The yield of moist product was 405 g., M.P. 34 to 35° C. This crude dioxolene was heated to boiling with 1300 ml. hexane on the steam bath and the nearly colorless, cloudy solution was decanted from a small layer of oil and water. The hexane solution was clarified by shaking with 50 g. sodium sulfate and filtering. The hexane solution was cooled and seeded and left in a deep-freeze overnight. The colorless product was collected by filtration and dried in vacuo. The yield of 2,2-dimethyl-4(3',3',3'-trinitropropyl)-1,3-dioxolane was 3.6 g., M.P. 38 to 39° C.

When the foregoing example is twice repeated using first acetaldehyde and then benzophenone in lieu of acetone, good yields of 2-methyl-4(3',3',3'-trinitropropyl)-1,3-dioxolane and 2,2-diphenyl-4(3',3',3'-trinitropropyl)-1,3-dioxolane, respectively, are obtained.

TABLE I

| Diol | Aldehyde or Ketone | Dioxolane |
|---|---|---|
| 5,5,5-trinitro-1,2-pentanediol | Acetone | 2,2-dimethyl-4(3',3',3'-trinitropropyl)-1,3-dioxolane. |
| Do | Methyl ethyl ketone | 2-methyl-2-ethyl-4(3',3',3'-trinitropropyl) 1,3-dioxolane. |
| Do | Benzophenone | 2,2-diphenyl-4(3',3',3'-trinitropropyl)-1,3-dioxolane. |
| Do | Ethyl benzyl | 2-ethyl-2-benzyl-4(3',3',3'-trinitropropyl)-1,3-dioxolane. |
| Do | Diisopropyl ketone | 2,2-diisopropyl-4(3',3',3'-trinitropropyl)-1,3-dioxolane. |
| Do | Acetaldehyde | 2-methyl-4(3',3',3'-trinitropropyl)-1,3-dioxolane. |
| Do | O-methyl benzaldehyde | 2-tolyl-4(3',3',3'-trinitropropyl)-1,3-dioxolane. |
| Do | Valeraldehyde | 2-pentyl-4(3',3',3'-trinitropropyl)-1,3-dioxolane. |

Another class of novel compounds of this invention have the following general formula (III) 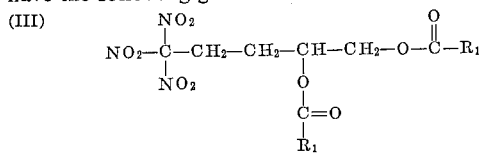

wherein $R_1$ is hydrocarbyl. Preferably, $R_1$ is an alkyl group, more preferably having from 1 to about 6 carbon atoms such as methyl, ethyl, butyl and hexyl. Other hydrocarbyl groups which may be substituents on the above diester are aryl, alkaryl and aralkyl. Normally, $R_1$ has from 1 to about 20 carbon atoms.

Illustrative of the compounds of Formula III are 5,5,5-trinitro-1,2-pentanediol diacetate, 5,5,5-trinitro-1,2,-pentanediol dibenzoate, 5,5,5-trinitro-1,2-pentanediol dihexanoate, 5,5,5,-trinitro-1,2-pentanediol dipropionate, 5,5,5 - trinitro-1,2 - pentanediol dihydrocinnamate, and 5,5,5,-trinitro-1,2-pentanediol ditolyluate.

The novel esters of the above formula are prepared in accordance with the following general reaction:

(IV) 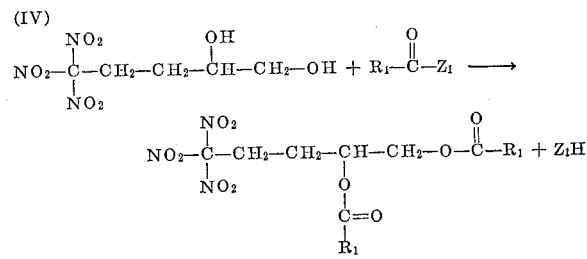

wherein $R_1$ is as defined above, and $Z_1$ is hydroxy or halo, preferably chloro or bromo.

The above reaction may optionally be carried out in any inert solvent, i.e., chloroform, carbon tetrachloride, hexane, methanol, etc. The proportions of the reactants employed in the reaction are not critical. Normally, stoichiometrically equivalent amounts are used since this results in the most economical utilization of the reactants. Thus, usually one mole of alcohol is used per mole of acid or acid halide. The reaction temperature should normally be sufficiently high so that the reactants will dissolve to a substantial degree in the reaction medium, but in any event, the reaction temperature should be below the decomposition temperature of the reactant. Normally, the reaction is conducted at a temperature between about 0° C. and about 150° C. The most preferred temperature is from about +20° C. to about 90° C. Pressure is not critical in this reaction. Therefore, while any pressure can be used, the reaction is normally run under atmospheric pressure.

It is to be understood that the acid ingredient may be generated in situ from the corresponding acid anhydride. Thus, acetic acid may be furnished by acetic anhydride.

The above reaction is preferably conducted in the presence of an effective catalytic amount of an acid esterification catalyst such as aluminum chloride or boron trifluoride etherate.

EXAMPLE II

*5,5,5-trinitro-1,2-pentanediol diacetate*

Two and four tenths g. 5,5,5-trinitro-1,2-pentanediol was dissolved with slight warming in 15 ml. chloroform. Then 4.0 ml. of acetic anhydride and a spatula-tip of aluminum chloride was added. Reflux was continued for 8 hours. Chloroform, acetic acid, and excess acetic anhydride was removed under vacuum. The residual was distilled at 120 to 125° C. The distillate was colorless, had an index of refraction of 1.4646 at 25° C. The residue was a small amount of yellowish solid. The ester was redistilled at 1.1 to 1.4 mm. at 110 to 115° C. Obtained complete distillation, index of refraction 1.4648 at 25° C.

*Analysis.*—Calc'd for: C, 33.44; H, 4.05; N, 13.00. Found: C, 31.70; H, 3.99; N, 13.23.

When the above example is repeated employing propionic acid in lieu of acetic anhydride, 5,5,5-trinitro-1,2-pentanediol dipropionate is obtained.

EXAMPLE III

*5,5,5-trinitro-1,2-pentanediol dibenzoate*

Two and eight-tenths g. 5,5,5-trinitro-1,2-pentanediol was dissolved with slight heating in 20 ml. carbon tetrachloride. Then about 10 ml. of benzoic acid was added. The mixture was refluxed for about 12 hours. The unreacted benzoic acid and the carbon tetrachloride was removed under vacuum. Elemental analysis of the residue showed it to be substantially pure 5,5,5-trinitro-1,2-pentanediol dibenzoate.

When Example III is repeated using toluic acid in lieu of benzoic acid, a good yield of 5,5,5-trinitro-1,2-pentanediol ditolyluate is obtained.

The compounds of Formulae I and III may be isolated in conventional manner by filtration, evaporation, extraction and/or distillation.

The compounds of Formulae I and III, which contain a plurality of nitro groups, are inherently useful as high explosives. These compounds can also be used in any conventional explosive missile, projectile, rocket or the like, as the main explosive charge. An example of such a missile is described in U.S. Patent 2,470,162, issued May 17, 1949. One way of using such high explosives in a device such as that disclosed in U.S. Patent 2,470,162 is to absorb the liquid explosive in an absorbent material such as cellulose, wood pulp, or sawdust. The resultant dynamite-type explosive can then be packed into the warhead of the missile. A charge thus prepared is sufficiently insensitive to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

The esters and acetals of this invention are also useful as fungicides.

This example describes a particular method of preparing a novel propellant composition according to this invention from the following ingredients wherein 2,2-dimethyl-4(3′,3′,3′-trinitropropyl)1,3-dioxolane is one of the plasticizers.

EXAMPLE IV

| Ingredient: | Weight percent |
|---|---|
| Ammonium perchlorate | 65.00 |
| Aluminum | 13.00 |
| Copper chromite | 0.50 |
| Phenyl betanaphthylamine | 0.20 |
| Ferric acetylacetonate | 0.08 |
| Glycerol monoricinoleate | 1.08 |
| Polypropylene glycol (M.W.=2000) | 13.76 |
| Dioctyl azelate | 4.00 |
| 2,2 - dimethyl - 4(3′,3′,3′-trinitropropyl)-1,3-dioxolane | 0.20 |
| Lecithin | 0.20 |
| Tolylene diisocyanate | 1.98 |
| | 100.00 |

The aluminum powder is stirred into about ⅓ of the required volume of polypropylene glycol and glycerol monoricinoleate. The mixture is prepared in a stainless steel container, using a copper-beryllium spatula. Mixing is continued for about ten minutes.

The aluminum slurry is added to a conventional mixer equipped with facilities for heating, cooling, and vacuumizing the propellant mix. The walls of the aluminum slurry container are scraped thoroughly. The container is rinsed with ½ of the required volume of dioctyl azelate and the rinses are added to the mixer. The remaining polypropylene glycol is added to the mixer. The 2,2-dimethyl-4(3′,3′,3′-trinitropropyl)-1,3-dioxolane is mixed with the remaining dioctyl azelate until homogeneous and the solution is then added to the mixer.

With the mixer off, the ferric acetylacetonate, phenyl betanaphthylamine, and lecithin are added through a 40-mesh screen. The copper chromite is added to the mixer.

The mixer is covered and mixed by remote control for 15 minutes under 26 to 28 inches of vacuum, after which it is stopped and the vacuum released with dry nitrogen. The cover is removed from the mixer and the oxidizer is added by remote control with the mixer blades in motion.

After all of the oxidizer has been added, the mixer is stopped and scraped down. The propellant mass is mixed for 15 minutes at 70° F. under 26 inches vacuum by remote control. The mixer is stopped and the vacuum released with dry nitrogen. The tolylene diisocyanate is added, after which the mass is mixed for ten minutes at 70° F. and 26 inches of vacuum by remote control. The vacuum is then released with dry nitrogen and the mixture is cast.

It will be understood that various modifications may be made in this invention without departing from the spirit thereof or the scope of the appended claims.

I claim:
1. Compounds of the formula:

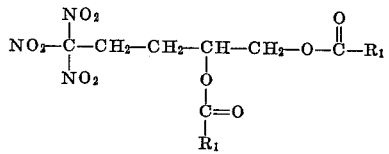

wherein $R_1$ is selected from the group consisting of alkyl, aryl, aralkyl and alkaryl, and contains from 1 to about 20 carbon atoms.

2. Compounds of the formula

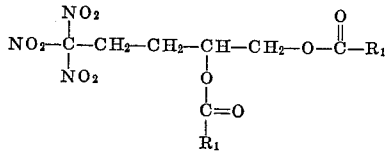

wherein $R_1$ is lower alkyl.

3. Compounds of the formula

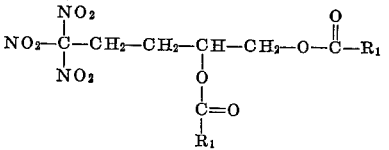

wherein $R_1$ is a lower alkyl group of from 1 to 6 carbon atoms.

4. The compound 5,5,5-trinitro-1,2-pentanediol diacetate.

References Cited by the Examiner

UNITED STATES PATENTS

| | | | |
|---|---|---|---|
| 2,185,297 | 1/1940 | Gloor | 260—488 |
| 2,374,484 | 4/1945 | Haas et al. | 260—488 |
| 2,518,940 | 8/1950 | Rust et al. | 260—476 |
| 2,861,081 | 11/1958 | Petrie | 260—340.9 |
| 2,862,007 | 11/1958 | Stansbury et al. | 260—340.9 |
| 2,889,359 | 6/1959 | Guest et al. | 260—488 |
| 2,978,455 | 4/1961 | Frankel | 260—488 |
| 2,993,055 | 7/1961 | Hennis et al. | 260—340.9 |
| 3,101,378 | 8/1963 | Linden | 260—635 |
| 3,223,725 | 12/1965 | Hill | 260—476 |

LORRAINE A. WEINBERGER, *Primary Examiner.*

RICHARD K. JACKSON, *Examiner.*

NORMA S. MILESTONE, V. GARNER,
*Assistant Examiners.*